United States Patent [19]

Smith

[11] Patent Number: 5,178,505
[45] Date of Patent: Jan. 12, 1993

[54] THREE-POINT HITCH ATTACHMENT WITH HAY MOVER

[76] Inventor: Charles S. Smith, Rte. 1, Box 301 B, Brookland, Ark. 72407

[21] Appl. No.: 756,035

[22] Filed: Sep. 6, 1991

[51] Int. Cl.⁵ .............................................. B60P 3/00
[52] U.S. Cl. .................................. 414/24.5; 414/703; 414/920
[58] Field of Search .................... 294/120, 126, 128; 414/24.5, 24.6, 697, 707, 710, 711, 917, 920, 703, 712

[56] References Cited

U.S. PATENT DOCUMENTS

| 3,957,167 | 5/1976 | Jacobson et al. | 414/703 |
| 4,120,405 | 10/1978 | Jones et al. | 414/24.5 |
| 4,364,700 | 12/1982 | Arabshian et al. | 414/24.5 |
| 4,674,786 | 6/1987 | Lynch | 414/24.5 X |

FOREIGN PATENT DOCUMENTS

| 564541 | 10/1958 | Canada | 414/703 |
| 275991 | 10/1964 | Netherlands | 414/703 |
| 624460 | 6/1949 | United Kingdom | 414/703 |
| 784162 | 10/1957 | United Kingdom | 414/703 |
| 2136766 | 9/1984 | United Kingdom | 414/24.5 |

Primary Examiner—David A. Bucci
Assistant Examiner—Janice Krizek
Attorney, Agent, or Firm—Jacobson, Price, Holman & Stern

[57] ABSTRACT

An attachment for the three-point hitch of a farm tractor including a generally vertically disposed, inverted U-shaped frame having outwardly extending lower ends connected to a pair of lower lift arms forming part of the three-point hitch of the tractor. The top portion of the frame is pivotally and longitudinally adjustably connected to a telescopically adjustable stabilizer link or bar having its forward end pivotally connected to the usual attachment point of the stabilizer link of a three-point hitch assembly provided on a farm tractor. The outer end of the stabilizer bar includes a transverse sleeve by which various devices including a round hay bale moving device can be pivotally attached. The upper surface of the longitudinally movable component of the telescopic stabilizer bar is provided with a rigid lug to which a hydraulic ram can be pivotally connected with the other end of the hydraulic ram being connected pivotally to the hay moving device or other device attached to the outer end of the stabilizer bar.

15 Claims, 3 Drawing Sheets

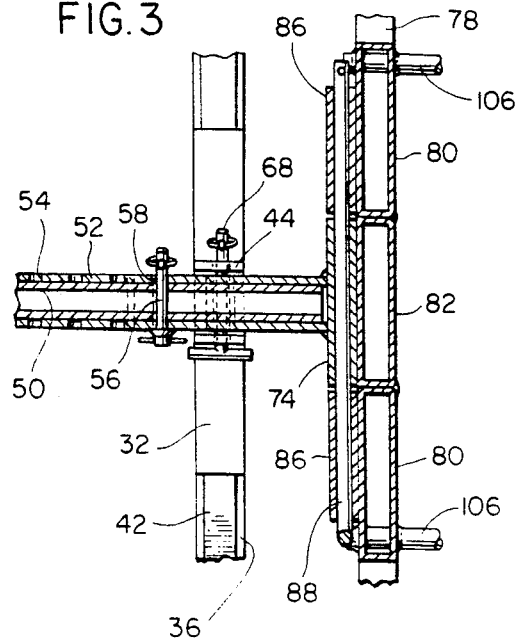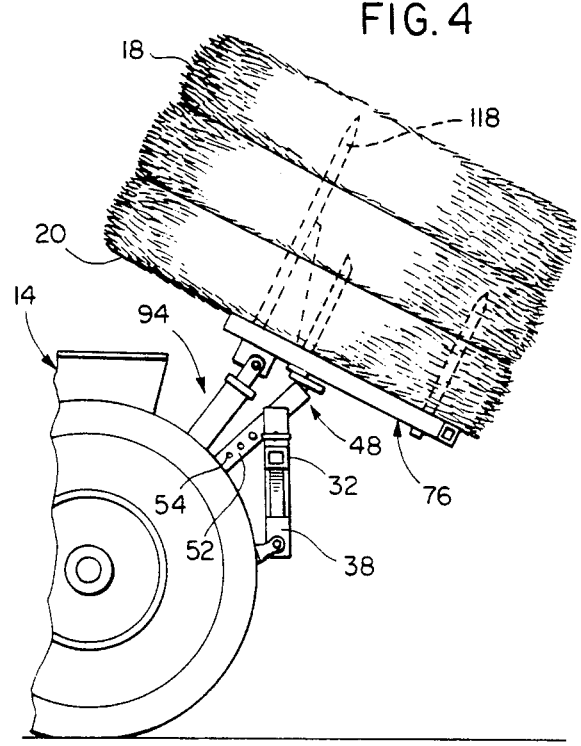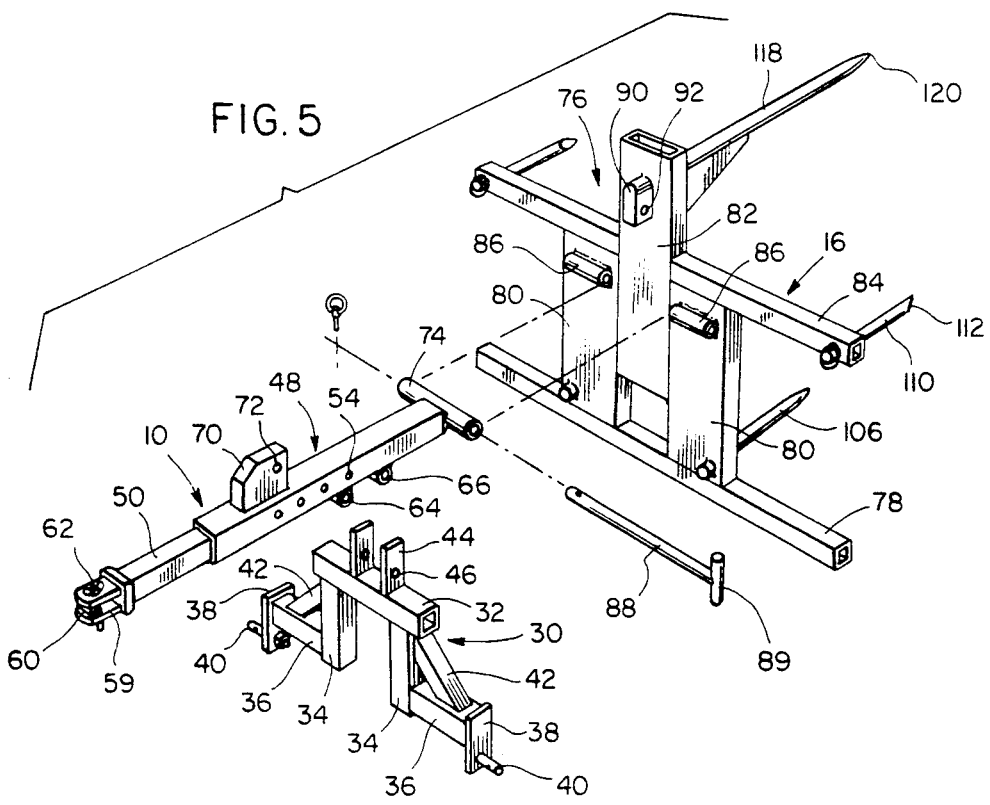

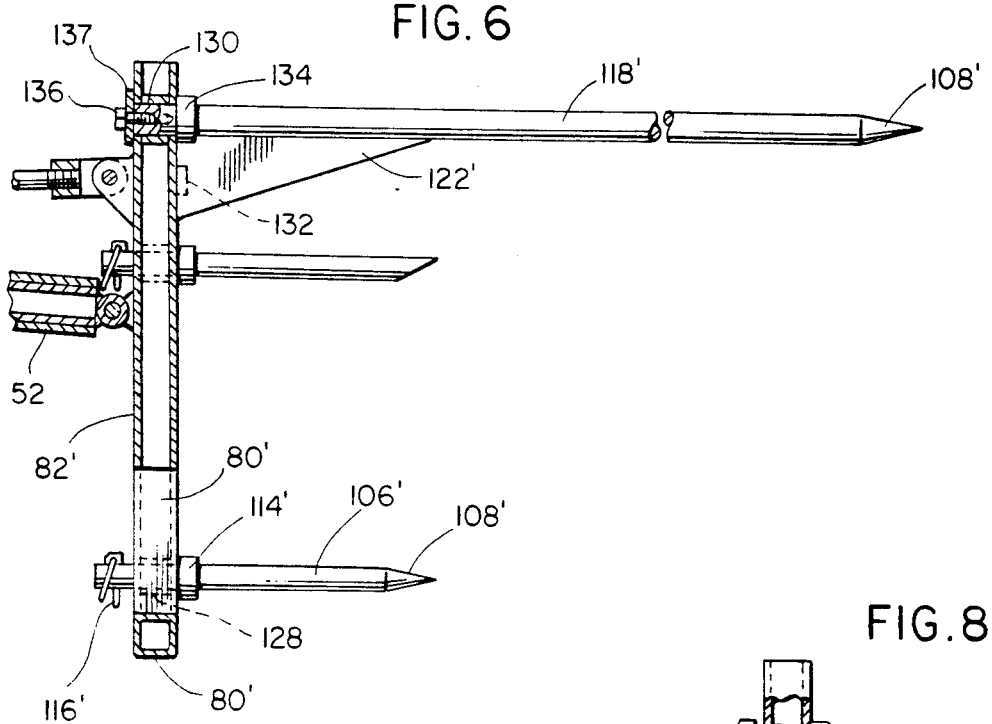
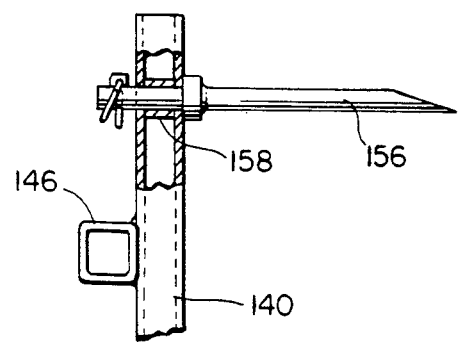
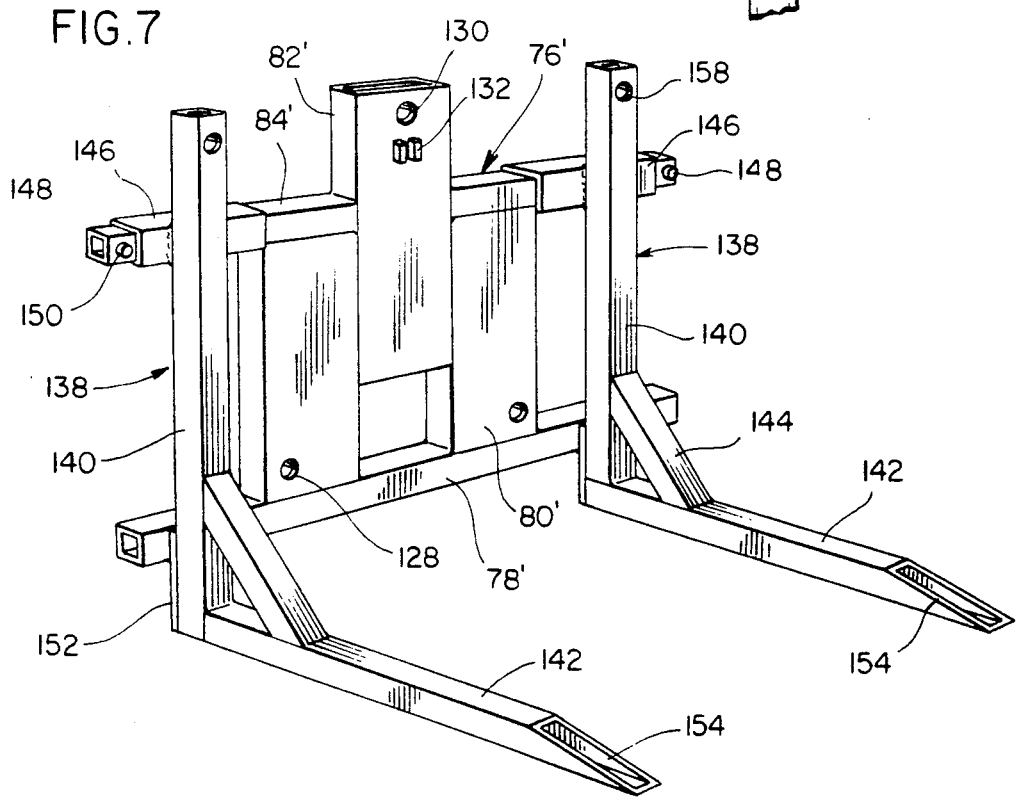

THREE-POINT HITCH ATTACHMENT WITH HAY MOVER

BACKGROUND OF INVENTION

1. Field of Invention

The present invention generally relates to an attachment for the three-point hitch of a farm tractor with the attachment adapted to receive various devices enabling use of the three-point hitch for various purposes in addition to connecting farm implements thereto. The attachment includes a generally vertically disposed, inverted U-shaped frame having outwardly extending lower ends connected to a pair of lower lift arms forming part of the three-point hitch of the tractor. The top portion of the frame is pivotally and longitudinally adjustably connected to a telescopically adjustable stabilizer link or bar having its forward end pivotally connected to the usual attachment point of the stabilizer link of a three-point hitch assembly provided on a farm tractor. The outer end of the stabilizer bar includes a transverse sleeve by which various devices including a round hay bale moving device can be pivotally attached. The upper surface of the longitudinally movable component of the telescopic stabilizer bar is provided with a rigid lug to which a hydraulic ram can be pivotally connected with the other end of the hydraulic ram being connected pivotally to the hay moving device or other device attached to the outer end of the stabilizer bar.

2. Description of the Prior Art

Hay balers which produce relatively heavy cylindrical hay bales have generated the necessity of providing mechanisms for lifting and handling such hay bales. Various devices have been provided for attachment to trucks, tractors and similar vehicles by which the large, heavy round hay bales can be lifted and handled. The following U.S. patents disclose devices relating to this field of endeavor.

U.S. Pat. No. 4,364,700 discloses a device of this type that is connected to the three-point hitch of a farm tractor and includes a pair of parallel forks 42 and 44 which slide under a round hay bale which then can be lifted by utilizing a hydraulic ram 54 and the three-point hitch on the rear of a tractor. However, none of the above patents disclose the specific structural arrangement and relationship of the components incorporated into this invention.

SUMMARY OF THE INVENTION

An object of the present invention is to provide an attachment for the three-point hitch of a farm tractor in which the attachment includes a longitudinally telescopic upper stabilizer bar combined with an inverted U-shaped frame pivotally connected to the movable component of the stabilizer bar with the lower ends of the inverted U-shaped frame being pivotally connected to the outer ends of the lift arms of the three-point hitch thereby providing an adjustment in the angular orientation of the components to provide a variation in the lifting capability of the attachment both as to vertical height and angular disposition.

Another object of the invention is to provide an attachment in accordance with the preceding object together with a hay moving and handling device connected to the attachment for pivotal movement about a transverse axis at the outer end of the telescopic stabilizer bar together with a hydraulic ram positioned above the stabilizer bar and pivotally connected to a lug on the longitudinally movable component of the telescopic stabilizer ba and a lug on the hay moving device to vary the angular position of the hay moving device in relation to the attachment connected to the three-point hitch thereby enabling the hay moving device to move the hay bale from a position at rest on the ground to an upwardly elevated and angulated relationship to facilitate lifting the heavy round hay bale when loading or unloading a wagon, trailer or other vehicle or to stack hay bales or unstack hay bales and deliver them to a point of use.

A further object of the invention is to provide a three-point hitch attachment with a hay mover mounted thereon in which the hay mover includes a vertical frame structure having a plurality of tines projecting therefrom with the uppermost centrally disposed tine being relatively large and elongated as compared to the lower tines oriented laterally outwardly from the central upper tine to engage and stabilize a round hay bale in relation to the hay mover.

Still another object of the invention is to provide a three-point hitch attachment with a hay mover in which the components are quickly and easily assembled in relation to a three-point hitch with the hay mover being quickly and easily attached to the hitch attachment in a quick and easy assembly procedure with the attachment and hay mover being rugged in construction, longlasting and dependable in operation with the construction of the connection between the hay mover and the attachment enabling the hay mover to be easily attached and detached and enabling other devices to be quickly and easily connected to the attachment.

A still further object of the invention is to provide a three-point hitch attachment in accordance with the preceding objects in which all five tines on the hay moving attachment are removably mounted to enable them to be removed for ease of handling and shipping the attachment by eliminating the pointed tines in perpendicular relation to the frame. This also enables a pair of removable lift forks to be attached to the frame for use as an attachment for the hay mover.

These together with other objects and advantages which will become subsequently apparent reside in the details o construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a plan sectional view taken substantially upon a plane passing along section line 3—3 on FIG. 2 illustrating further structural details of the invention.

FIG. 4 is a side elevational view illustrating a round hay bale oriented in lifted and angulated position by the present invention.

FIG. 5 is an exploded group perspective view illustrating the relationship of the components of the invention.

FIG. 6 is a view similar to a portion of FIG. 2 and illustrating the structure which enables all five of the tines to be removed.

FIG. 7 is a perspective view of the frame with the tines removed and a pair of lifting forks attached to the frame.

FIG. 8 is an elevational view of one of the lift forks illustrating an optionally provided tine removably attached at the upper end thereof.

DESCRIPTION OF THE PREFERRED EMBODIMENT

Figure 1:
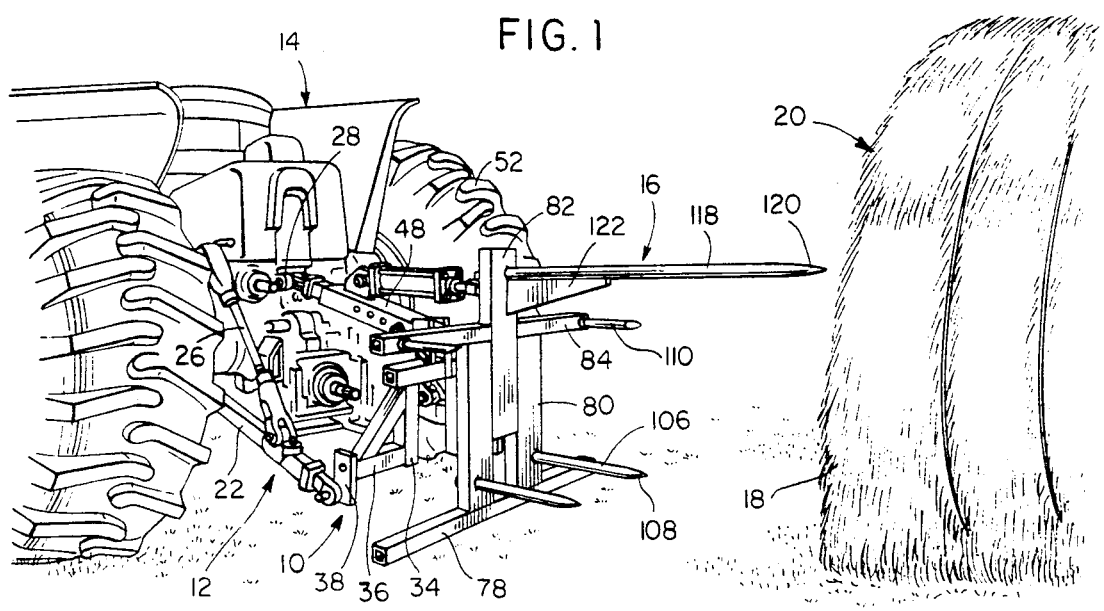
FIG. 1 is a perspective view of the three-point attachment and hay mover of the present invention illustrating their association with a farm tractor and a round hay bale.

Referring now specifically to the drawings, the attachment of the present invention is generally designated by reference numeral 10 with the attachment being connected to a conventional three-point hitch system generally designated by reference numeral 12 on a farm tractor 14. A hay moving and handling device generally designated by reference numeral 16 is connected to the attachment 10 to facilitate handling an moving a cylindrical hay bale 18 having a substantially flat end 20. The hay bale 18 is a conventional round hay bale usually weighing at least 1000 lbs. although the size and weight of the hay bale may vary as is well known.

The three-point hitch 12 on the tractor 14 includes a pair of lower arms 22 pivotally connected to the tractor at 24 with a pair of lift links 26 connected to the arms 22 and being connected to lift arms on the tractor in a conventional and well known manner with the arms 22 forming two-points of the three-point hitch attachment. The third point of the three-point hitch is a pivot bracket structure 28 located above and centrally between the lower arms 22. The structure of the tractor and the three-point hitch system incorporated thereon represent conventional and well known farm tractor structure.

The attachment 10 of the present invention includes an inverted U-shaped frame generally designated by reference numeral 30 and, as illustrated in FIG. 5, includes a transversely extending horizontal top member 32 having a pair of depending parallel side members 34 rigidly affixed thereto inwardly from the ends of the member 32 with the members 34 being spaced apart to form an inverted U-shaped structure and a space to permit a power take off shaft to pass therethrough to power a device supported by the attachment. The lower end of each of the vertical members 34 includes a laterally extending member 36 terminating in a vertical plate 38 having a pin 40 projecting outwardly therefrom for reception in an aperture in the end of the lower arm 22 with a retaining pin extending through an aperture in the pin 40 to retain the inverted U-shaped member connected to the outer ends of the lower arms 22. Inclined braces 42 are provided between the upper end of each of the members 34 and the outer end of each of the members 36 with the members 32, 34, 36 and 42 being constructed of hollow tubular members thereby providing a rigid, inverted U-shaped structure. The transverse member 32 is provided with a pair of parallel, upwardly extending lugs 44 thereon provided with an aperture 46 with the apertures being transversely aligned.

The attachment 10 also includes a stabilizer bar 48 including an inner tubular member 50 and an outer tubular member 52 arranged in telescopic relation with the outer tubular member 52 including a plurality of longitudinally spaced transversely extending apertures 54 therein for receiving a lock pin 56 extending therethrough which also extends through an aperture 58 in the inner tubular member 50 thereby enabling the stabilizer ba 48 to be longitudinally adjustable in length by sliding the outer tubular member 52 longitudinally on the inner tubular member 50 and inserting the lock pin 56 through the aperture 54 that is aligned with the aperture 58. The end of the inner tubular member 50 projecting from the outer tubular member 52 is provided with a pair of vertically spaced lugs 59 thereon which receive a pair of perpendicular sleeves 60 and 61 therebetween. The sleeves 60 and 61 are rigid with each other with a lock pin 62 pivotally connecting sleeve 61 to lugs 59 and a lock pin 63 pivotally connecting sleeve 60 to bracket 28 thereby connecting the stabilizer bar 48 to the pivot bracket 28. The bottom surface of the outer tubular member 52 is provided with a pair of transversely extending tubular sleeves 64 and 66 which are rigidly affixed under the outer tubular member 52 as by welding or the like with the length of the tubular sleeves 64 and 66 being substantially the same as the transverse width of the tubular member 52 and the distance between the lugs 44 thereby enabling a lock pin 68 to be inserted through the apertures 46 and the lugs 44 and one of the sleeves 64 and 66 thereby enabling the pivotal point of connection between the inverted U-shaped bracket 30 and the outer tubular member 52 to be longitudinally adjusted along tubular member 52 with the lock pin 56 enabling the effective length of the stabilizer bar 48 to be adjusted. The upper surface of the tubular member 52 is provided with an upstanding lug 70 extending longitudinally along the center thereof adjacent the end of the tubular member which receives the inner tubular member 50 with a transverse aperture 72 being provided in the corner of the lug remote from the tubular member 50. The rearward end of the outer tubular member 52 is provided with a transversely extending tubular sleeve 74 which is longer than the transverse dimension of the tubular member 52 as illustrated in FIG. 5 for purposes of attaching the hay moving and handling device 16 as described hereinafter.

The hay moving device 16 includes a vertically disposed rigid frame generally designated by reference numeral 76 and which includes an elongated, transversely extending bottom frame member 78 having a pair of vertically disposed tubular members 80 rigidly affixed thereto in spaced relation with the tubular members having a generally rectangular transverse cross-sectional configuration and extending vertically in spaced relation to each other with a central vertical tubular member of substantially the same configuration designated by reference numeral 82 received therebetween with the lower end of the tubular member 82 being spaced upwardly from the bottom member 78 and extending above the upper ends of the tubular members 80. A pair of laterally outwardly extending tubular members 84 extend across the top of the tubular members 80 and laterally outwardly therefrom in generally parallel relation to the bottom member 78 and in vertically spaced relation thereto with the inner ends of the tubular members 84 being rigidly affixed to the tubular member 82 with the inner end portion of the bottom surface of the tubular members 84 being secured to the upper ends of the tubular members 80 with these components rigidly affixed to each other as by welding or the like.

The rear upper surface of each of the tubular members 80 is provided with a transversely extending tubular sleeve 86 which are in alignment with each other and spaced apart a distance to receive the tubular sleeve 74 therebetween with the sleeve 74 being aligned with the sleeves 86 and receiving a pivot lock rod 88 therethrough having a T-handle 89 on one end thus pivotally connecting the hay moving device 16 to the rearward end of the stabilizer bar 48 for pivotal movement about an axis transverse to the stabilizer bar 48. The upper rear central portion of the vertical tubular member 82 is provided with a lug 90 thereon having an aperture 92 therein by which a hydraulic ram 94 is pivotally connected between the lugs 70 and 90 with a pivot lock pin 96 extending through the lug 90 and a U-shaped clevis 98 on the piston rod of the hydraulic ram and a pivot pin 100 extending through a U-shaped clevis 102 on the cylinder end of the ram 94 and the aperture 72 in the lug 70. The hydraulic ram 94 is connected with hydraulic hoses 104 at each end of the cylinder with the hoses being connected to a suitable control valve for supplying hydraulic fluid to and from the ends of the ram to provide a double-acting piston and cylinder arrangement to control the angular position of the hay moving device about the transverse axis defined by the pivot rod 88 for a purpose described hereinafter.

The outer lower corner of each of the vertical members 80 is provided with a rigidly attached rearwardly extending tin 106 having a tapered pointed end 108 at the rearward end thereof for penetrating engagement into the hay bale 18. Also, the outer end of each of the horizontal tubular members 84 is provided with a tine 110 connected thereto having an inclined or slanted pointed rearward end 112 with the tines 110 also penetrating the bale. The tines 110 are removably connected to the member 84 and are provided with a flange 114 spaced from the end thereof which extends through the tubular member 84 and receives a retaining lock pin 116 on the end thereof adjacent the surface of the horizontal tubular member 84 thereby enabling the tines 110 to be removed from the hay moving device or attached thereto depending upon the installational requirements in each instance with the tines 110 being slightly shorter than the tines 106 but also serving to penetrate the end surface 20 of the hay bale 18 in generally parallel relation to the tines 106.

At the center of the upper tubular member 82, a larger and longer tine 118 is provided with the end of the tine 118 being tapered to a point at 120. A generally triangular gusset plate 122 is welded to the undersurface of the tine 118 and to the outer surface of the vertical tubular member 82 to rigidify the longer and upper tine with the gusset plate extending only over a minor portion of the lengthwise dimension of the tine 118. The tine 118 extends through the vertical tubular member 82 with the end thereof overlying and welded to the lug 90 to provide a rigid reinforcement for the lug 90 and also the lug 90 rigidifies the end of the tine 118 where it joins with the tubular member 82 with the connection between the tine 118 and the tubular member and lug being by welding 124 with the tines 106 also being welded at 126 to the lower outer corners of the tubular members 80. The tubular members 78 and 84 are of square cross-sectional configuration whereas the tubular members 80 and 82 are substantially larger in cross-sectional configuration and are of rectangular cross-sectional configuration with the configuration and construction of the tines and frame 76 together with the construction of the attachment 10 being sufficiently rugged to effectively lift, move and handle heavy round hay bales 18 in a manner to enable the tractor to be backed toward a hay bale 18 resting horizontally on the ground with the tines penetrating the hay bale from the end surface 20 thereof as illustrated in FIG. 4 with the length of the longest tine 118 being less than the length of the hay bale. Once the tines have been completed penetrated into the hay bale, the ram 94 may be actuated to pivot the hay bale upwardly slightly off the ground and the three-point hitch may be activated by the tractor operator to elevate the hay bale while angulating it to the position illustrated in FIG. 4 thereby enabling the hay bale to be lifted upwardly a distance sufficiently to load the hay bale onto a wagon, truck or other similar vehicle and also enabling the hay bale to be stacked onto adjacent horizontally disposed hay bales to facilitate storage of multiple hay bales in a stacked relation.

The round bale moving device 16 is connected to the attachment 10 by the use of two pins 88 and 96 with the pin 88 connecting the stabilizer bar to the device and the pin 96 connecting the hydraulic ram to the hay moving device. With this construction, there is a maximum range of lift of approximately 42" and with the use of the hydraulic ram, the structure is capable of loading or unloading hay bales on a flat bed trailer up to 46" high. The hydraulic ram can be used to level the tines or spears into a horizontal attitude at any point of the range of movement of the device which allows the hay bale to be attached and unattached to the hay bale mover at any point within the range of movement of the hay bale mover. Also, as illustrated in FIG. 4, when the hay bale is elevated and angulated, the weight of the bale is positioned above and as close as possible to the rear axle 15 of the tractor 14 thus reducing the cantilever weight of the bale in relation to the tractor. The manner in which the attachment is connected to the tractor provides a pivot action which increases the range of action obtained from the three-point hitch of the tractor with the telescopic members allowing for a greater or lesser range of motion with the hydraulic ram greatly increasing the range of action of the hay moving device.

Figure 2:
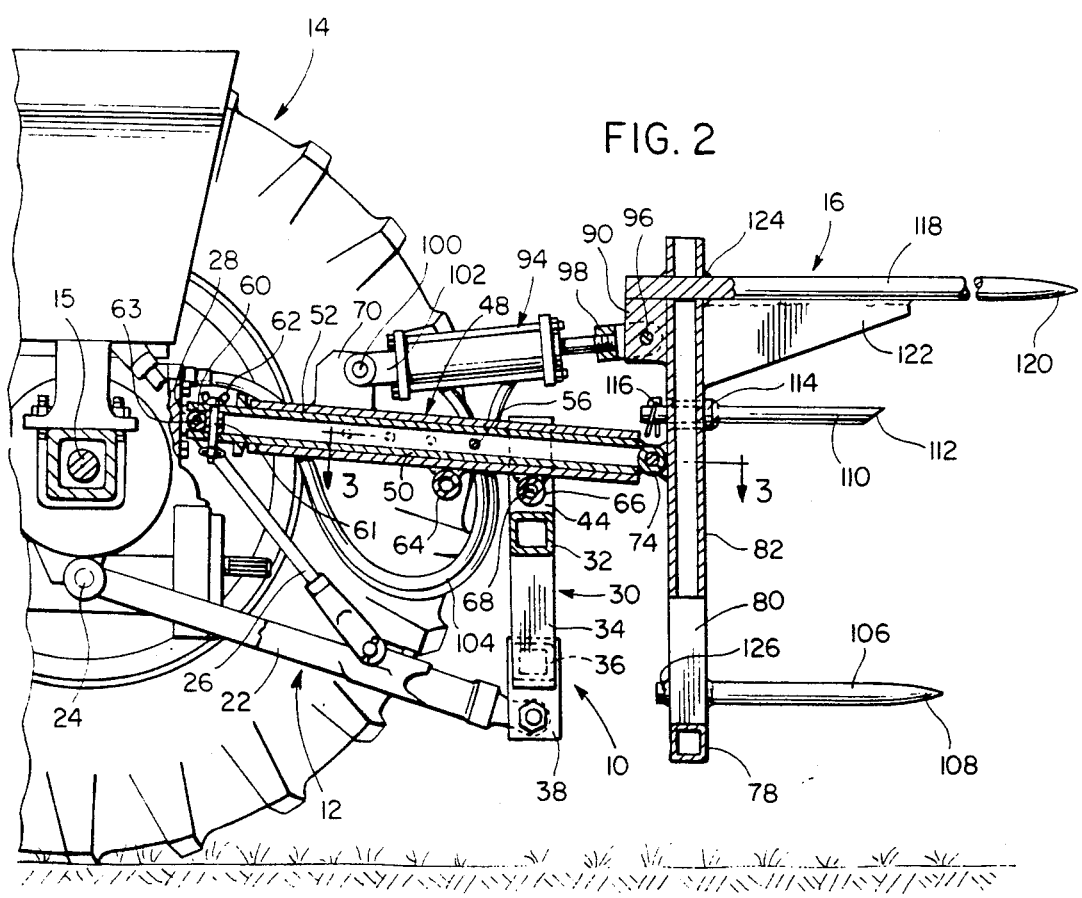
FIG. 2 is a side elevational view with portions in section, illustrating the structural relationship of the components of the present invention.

A modified form of the invention is illustrated in FIG. 6 in which all of the tines are removable with the tines 106' being removable in the same manner as the tines 110 are removable in FIG. 2. This structure includes a flange 114' spaced from the end of the tine 106' opposite the tapered end of 108' with the portion of the tine 106' outwardly of the flange 114' extending through a reinforced hole 128 in tubular member 80' with the end of the tine 106' including a removable lock pin 116' thus detachably connecting the tines 106' to the tubular members 80' in exactly the same manner as the tines 110 are connected to the tubular members 80 in FIG. 2.

The upper, centrally located and elongated tine 118' is detachably connected to the vertical tubular member 82' which includes a reinforced hole 130 extending therethrough and a pair of horizontally spaced, vertically disposed lugs 132 on the face of the tubular member 82' below hole 130 with the lugs 132 receiving the long vertical edge of the gusset plate 122'. The tine 118' is provided with a flange or peripheral ridge 134 thereon spaced from the end of the tine 118' with the end of the tine 118' being inserted through the reinforced hole 130 until the flange 134 engages the surface of the tubular member 82' and the edge of the gusset plate 122' is received between the lugs 132 and abuttingly engages the surface of the tubular member 82'. A headed bolt 136 with a washer 137 is threaded into the end of the tine 118' which extends through the hole 130 in the tubular member 82' thereby detachably locking the tine 118' in place with the gusset 122' engaging the lugs 132 stabilizing the tine 118' and reinforcing it and maintaining the gusset plate in depending relation from the tine 118'.

With this construction, all of the tines are removable so that the frame will not have any elongated projecting pointed members fixedly attached thereto. This permits all of the tines to be removed and easily stored in a compact condition when shipping or storing the three-point hitch attachment thus enabling the attachment to be more easily handled and stored and shipped in a compact and safe condition.

FIGS. 7 and 8 illustrate a pair of lift forks generally designated by reference numeral 138 which can be used on the frame 76' when the tines have been removed with each of the lifting forks including a vertical structural member 140 and a horizontal structural member 142 rigidly connected at their adjacent ends and rigidified by a diagonal brace 144 to define a generally L-shaped lifting fork with the structural members 140, 142 and 144 being of tubular metal stock connected by welding or the like. The upper rear surface of the vertical structural member 140 is provided with a tubular horizontally disposed sleeve 146 that is in perpendicular relation to the vertical member 140 and extends to both sides thereof with the tubular sleeve 146 being slidably received on the horizontal frame member 84' with the inner edge thereof abuttingly engaging the vertical tubular members 80' and the outer end thereof being retained on the horizontal frame member 84' by a lock pin 148 extending through a reinforced hole 150 which may be the same hole which receives tines 110 in FIG. 2 or additional holes provided closer to the ends of frame member 84'. This structure removably retains the set of lifting forks 138 on the frame 76'. As illustrated, the bottom rear surface of the vertical member 140 is provided with a reinforcing plate 152 thereon which is welded thereto and which rests against the front surface of the lower frame member 78' and serves as a wear-plate or reinforcement.

The attachment of the set of lifting forks 140 after removal of all of the tines enables the three-point hitch attachment to be used in the manner of a lift fork for lifting and handling various loads. The outer ends of the horizontal members 142 are beveled or inclined from the upper surface toward the bottom as indicated by reference numeral 15 to facilitate insertion of the prongs or tines formed by the lower structural members 142 to be inserted under a load that may be resting on a supporting surface. Also, the upper end of each of the vertical members 140 may have a tine 156 connected thereto through a reinforced hole 158 with the tine 156 being identical to the tines 110 or the tines 106' and connected to and retained on the vertical members 140 in the same manner thus enabling hay bales or other loads to be stabilized by the tines or prongs 156 impaling the hay bale or other load. This provides further optional functions to the attachment thus enhancing the utilitarian aspects of the invention.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An attachment for a three-point hitch of a farm tractor having a pair of horizontally spaced lower lift arms and an upper attachment point spaced vertically above the lift arms with the attachment enabling various devices to be connected to the tractor for performing work operations, said attachment comprising a frame having a pair of lower, outwardly extending pins for pivotal connection with the lower lift arms adjacent outer ends thereof, a stabilizer bar having an inner end pivotally connected to the upper attachment point on the tractor, means pivotally connecting the stabilizer bar to said frame in vertically elevated position above the outwardly extending pins, means connecting a device; to the stabilizer bar for movement therewith in a vertical plane when the lower lift arms of the three-point hitch on the tractor are swung in a vertical plane, means enabling longitudinal adjustment of the pivotal connecting means between the stabilizer bar and frame toward and away from the point of connection between the stabilizer bar and the upper attachment point on the tractor to vary the relationship of the stabilizer bar to the frame and vary the relationship of the frame to the lower lift arms during movement of the stabilizer bar, frame and lower lift arms in a vertical plane.

2. The attachment as defined in claim 1 wherein said means enabling adjustment of the pivotal connecting means between the stabilizer bar and frame includes the stabilizer bar being constructed of telescopic members with an outer telescopic member being pivotally connected to the frame, and means securing the outer telescopic member in longitudinally adjusted relation to an inner telescopic member, said inner telescopic member being connected to the upper attachment point o the tractor to enable adjustment of the point of connection of the frame to the stabilizer bar to vary the angular relation between the stabilizer bar and frame and between the frame and lower lift arms.

3. The attachment as defined in claim 2 wherein said outer telescopic member includes a pair of longitudinally spaced pivotal attachment means thereon for selective connection with said frame to provide adjustment of the angular relation between the telescoping stabilizer bar and the frame and between the frame and lower lift arms.

4. The attachment as defined in claim 3 wherein said frame is of inverted U-shaped construction including a pair of vertical members interconnected by a horizontal top member with the lower ends of the vertical members including outwardly extending members having said pins rigid thereon, the lower ends of the vertical members being spaced apart to provide passage for a power take off shaft connected with a power take off on the tractor located generally between the lower lift arms.

5. The attachment as defined in claim 3 wherein said pivotal connecting means between the frame and stabilizer bar includes a pair of spaced upstanding lugs on the frame and a pair of horizontally disposed, longitudinally spaced transverse sleeves rigidly affixed to an underside of said stabilizer bar.

6. The attachment as defined in claim 3 wherein said means connecting a device to the stabilizer bar includes a transversely extending sleeve on said stabilizer bar at an end thereof remote from the upper attachment point on the tractor, a pivot rod extending through said sleeve and adapted to engage sleeve means on a device.

7. The attachment as defined in claim 6 wherein said means connecting a device to the stabilizer bar includes an upstanding lug on the outer tubular member of the stabilizer bar, a hydraulic ram pivotally connected to said lug and including an end adapted to be connected with the device in spaced relation to the transversely extending sleeve on the end of stabilizer bar to enable variation in angular relation of the device to the stabilizer bar when the hydraulic ram is expanded or retracted.

8. The attachment as defined in claim 3 in combination with a device attached to the stabilizer bar in the form of a hay moving and handling device, said device including a generally vertically disposed frame having means thereon for connection with an end of the stabilizer bar remote from the upper attachment point, said device frame connected to the outer end of the stabilizer bar including a plurality of projecting means adapted to engage a round hay bale for lifting and handling the round hay bale by operating the three-point hitch of the tractor.

9. The attachment as defined in claim 8 wherein said projecting means includes an elongated, rigid tine having a pointed end for impaling a round hay bale and a plurality of additional tines with sharp ends positioned in spaced relation to the elongated tine and being relatively short and smaller in cross-sectional configuration for engaging and stabilizing a round hay bale impaled by the elongated tine to effectively support the hay bale when elevated and oriented in angular position to load or unload the hay bale from a load carrying vehicle and position the hay bale in a feeding area.

10. The attachment as defined in claim 9 wherein said pivotal connecting means between the frame and stabilizer bar includes a pair of spaced upstanding lugs on the frame and a pair of horizontally disposed, longitudinally spaced transversely extending sleeves rigidly affixed to an underside of said stabilizer bar, a lock pin extending through said lugs and one of said transversely extending sleeves, said means connecting a device to the stabilizer bar including a transversely extending sleeve on said stabilizer bar at an end thereof remote from the upper attachment point on the tractor, a pivot rod extending through said sleeve and adapted to engage sleeve means on a device.

11. The attachment as defined in claim 8 wherein each of said projecting means is in the form of a tine to penetrate into a round hay bale for lifting and handling the hay bale, and means removably connecting each of said tines to the vertically disposed device frame to enable the tines to be removed for shipping, handling and storage of the hay moving and handling device.

12. An attachment for a three-point hitch of a farm tractor having a pair of horizontally spaced lower lift arms and an upper attachment point spaced vertically above the lift arms with the attachment enabling various devices to be connected to the tractor for performing work operations, said attachment comprising a frame having a pair of lower, outwardly extending pins for pivotal connection with the lower lift arms adjacent outer ends thereof, a stabilizer bar having an inner end pivotally connected to the upper attachment point on the tractor, means pivotally connecting the stabilizer bar to said frame in vertically elevated position above the outwardly extending pins, said stabilizer bar including means connecting a device thereto for movement therewith in a vertical plane when the lower lift arms of the three-point hitch on the tractor are swung in a vertical plane, means enabling longitudinal adjustment of the pivotal connecting means between the stabilizer bar and frame toward and away from the point of connection between the stabilizer bar and the upper attachment point on the tractor to vary the relationship of the stabilizer bar to the frame and vary the relationship of the frame to the lower lift arms during movement of the stabilizer bar, frame and lower lifts arms in a vertical plane, in combination with a device attached to the stabilizer bar in the form of a hay moving and handling device, said device including a generally vertically disposed frame having means thereon for connection with an end of the stabilizer bar remote from the upper attachment point, said device frame connected to the outer end of the stabilizer bar including a plurality of projecting means adapted to engage a round hay bale for lifting and handling the round hay bale by operating the three-point hitch of the tractor, each of said projecting means being in the form of a tine to penetrate into a round hay bale for lifting and handling the hay bale, and means removably connecting each of said tines to the vertically disposed device frame to enable the tines to be removed for shipping, handling and storage of the hay moving and handling device, a set of lifting forks attached to said ventrally disposed device frame when the tines have bee removed, each lifting fork being of generally L-shaped configuration and including a horizontally disposed sleeve rigid with an upper portion of said fork and slidably received on said vertically disposed frame for mounting the lifting forks on the vertically extending frame.

13. The attachment as defined in claim 12 wherein each of said lifting forks includes a horizontal member having a beveled outer end for engaging under a load for lifting and handling the load.

14. The attachment as defined in claim 13 wherein each of said lifting forks includes a tine at the upper end thereof and means detachably securing the tine to the upper end of each of said lifting forks to enable a load to be penetrated by the tines to stabilize the load on the lifting forks.

15. A hay moving attachment for a three-point hitch of a farm tractor having a pair of lower lift arms and an upper attachment joint above the lift arms comprising a frame having a pair of lower ends pivotally connected to the lower lift arms, a stabilizer bar pivotally connected to the upper attachment point, a hay moving device frame disposed generally vertically and connected at an end of the stabilizer bar emote from the upper attachment point, transverse pivotal connecting means interconnecting an upper end of the frame and the stabilizer bar, transverse pivotal connecting means connecting the hay moving device frame to an end of the stabilizer bar and a hydraulic ram connected to the stabilizer bar and the hay moving device frame with pivotal connections at each end of the ram, the pivotal connecting means between the ram and the hay device frame being spaced vertically from the pivotal connecting means between the end of the stabilizer bar and the hay moving device frame to enable the hay moving device frame to be adjusted angularly about the transverse pivotal connecting means between the end of the stabilizer bar and the hay moving device frame, said stabilizer bar including inner and outer telescopic members to enable the effective length of the stabilizer bar to be adjusted with the inner tubular member being connected to the upper attachment point on the tractor and the outer tubular member including the pivotal connecting means with the hay moving device frame and the pivotal connecting means with the frame attached to the lift arms, said outer tubular member also having the ram pivotally connected thereto to vary the angular relation between the stabilizer bar and the frame connected to the lift arms by moving the outer tubular member longitudinally toward and away from the upper attachment point.

* * * * *